Oct. 22, 1935.  J. KUCHAR  2,018,178
DUMP WAGON
Filed Dec. 11, 1933  2 Sheets-Sheet 1
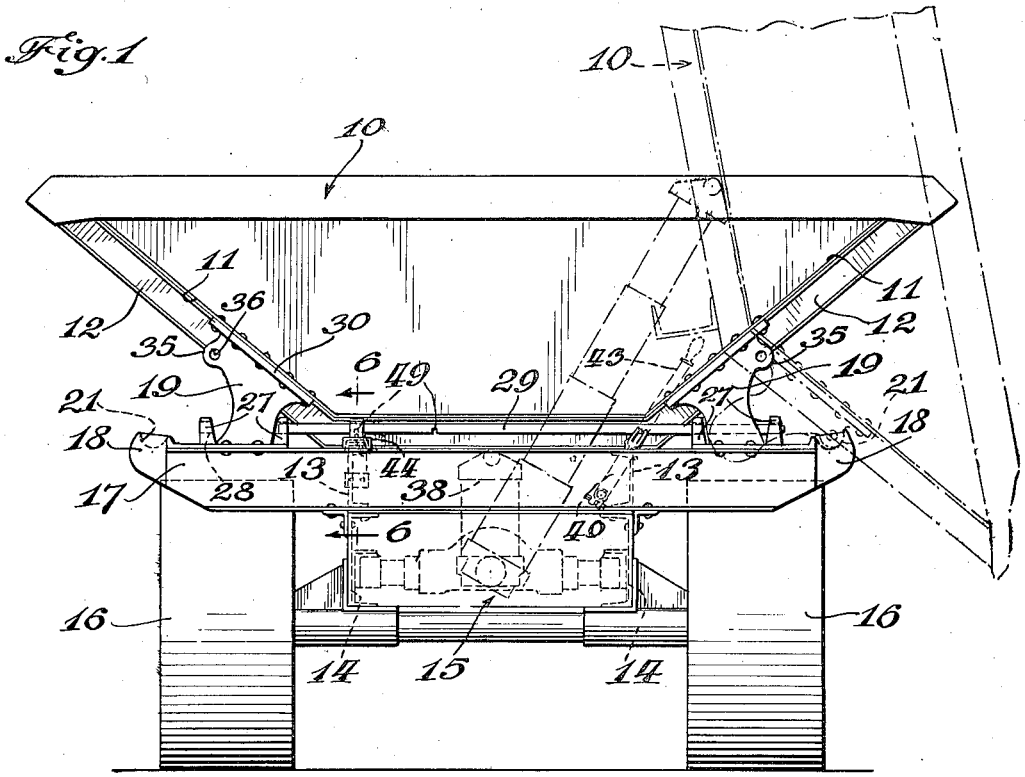
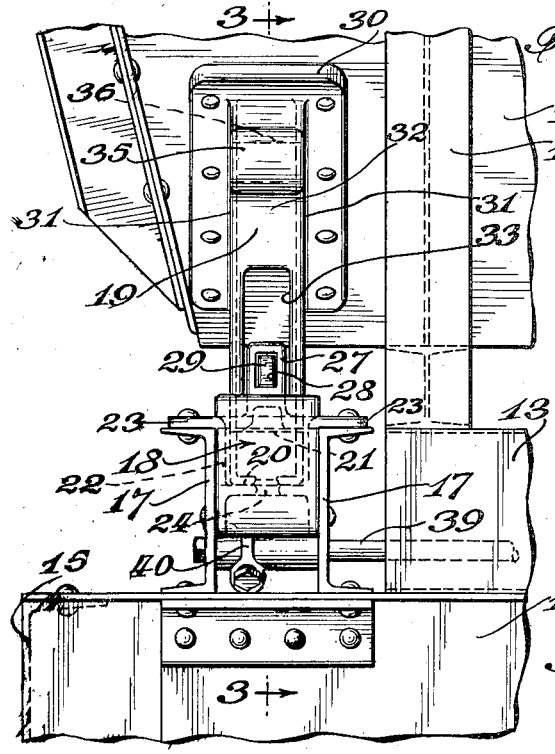
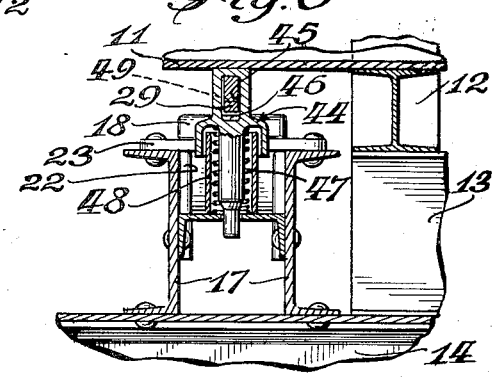
Inventor
Joseph Kuchar
By Williams, Bradbury, McCaleb & Hinkle
Attys Oct. 22, 1935.   J. KUCHAR   2,018,178
DUMP WAGON
Filed Dec. 11, 1933   2 Sheets-Sheet 2
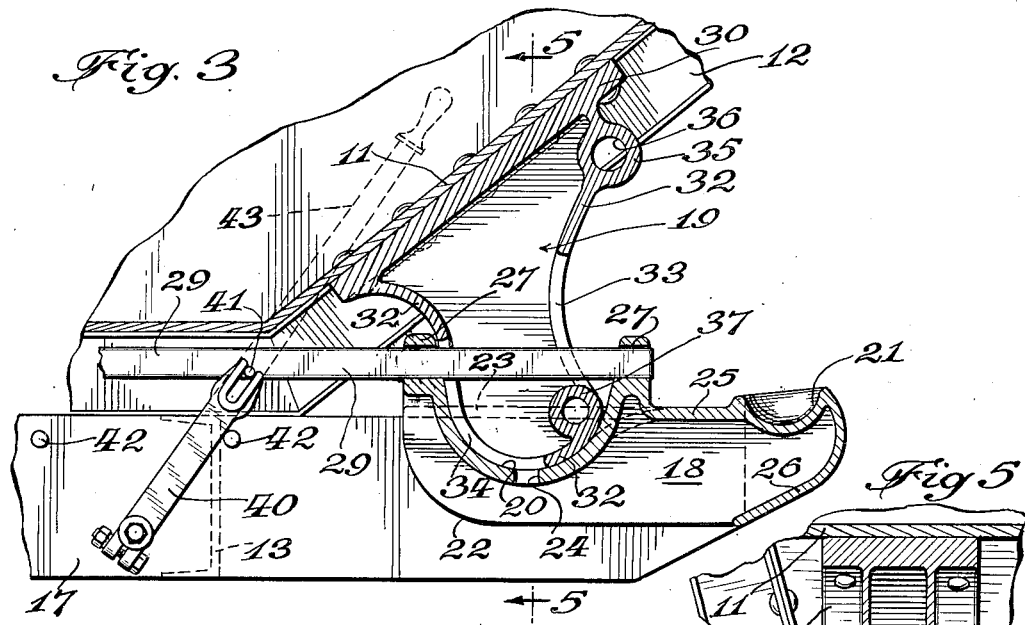
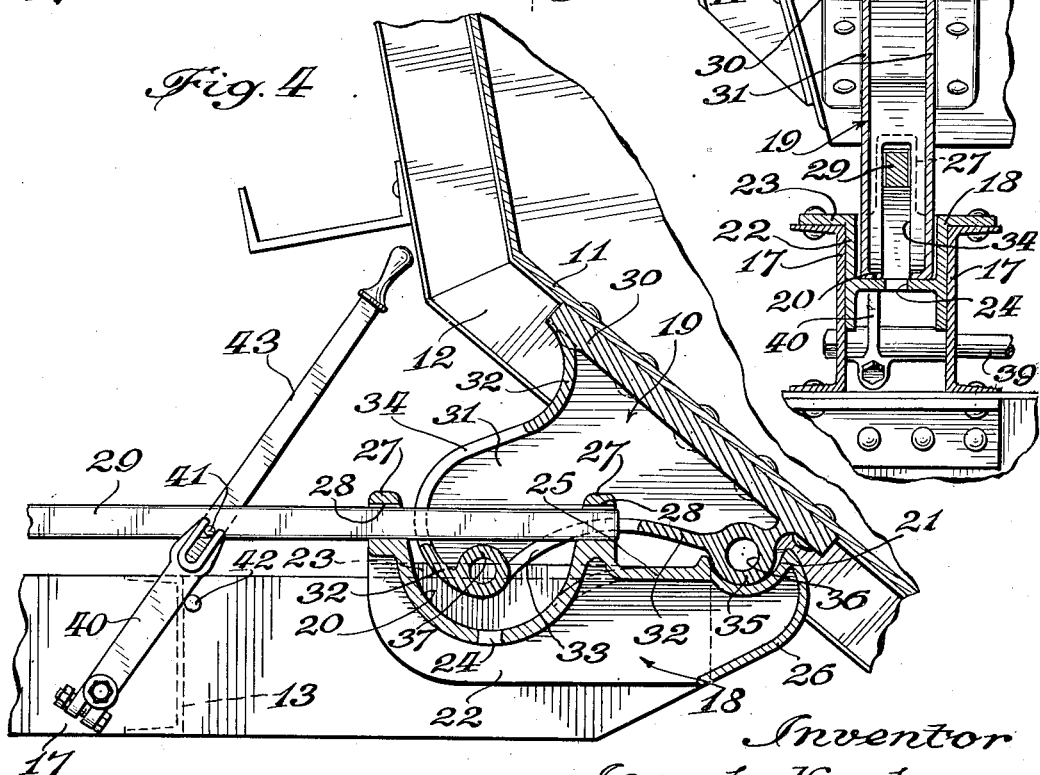
Inventor
Joseph Kuchar Patented Oct. 22, 1935

2,018,178

UNITED STATES PATENT OFFICE 2,018,178

DUMP WAGON

Joseph Kuchar, Chicago, Ill., assignor to Athey Truss Wheel Co., Chicago, Ill., a corporation of Illinois Application December 11, 1933, Serial No. 701,763

10 Claims. (Cl. 298—18)

This invention relates to dump wagons and more particularly to the pivotal support of dump wagons and to control means associated therewith whereby the wagon may be dumped to either side at will.

The invention will be described in its application to a wagon particularly adapted for the quarrying industry. It will, however, be readily understood that it may be applied to wagons and trailers intended for other purposes.

The invention will readily be understood from the following description of a preferred embodiment thereof, taken in conjunction with the accompanying drawings, in which Figure 1 is an end elevation of a wagon embodying the invention;

Fig. 2 is an elevational detail showing a hinge as viewed from one side;

Fig. 3 is a sectional detail view taken on the line 3—3 of Fig. 2;

Fig. 4 is a view similar to Fig. 3 showing the location of the hinge or pivot elements at the end of the dumping movement;

Fig. 5 is a sectional detail view taken on the line 5—5 of Fig. 3, and

Fig. 6 is a sectional detail view taken on the line 6—6 of Fig. 1.

Referring to the drawings, the reference numeral 10 designates a wagon body of a type particularly suitable for the transportation of rocks. This body is of general hopper-like shape having upwardly and outwardly diverging side walls 11 reinforced by suitable beams 12. The structure of this body need not be described minutely, the same being substantially similar to the body described in my previous Patent No. 1,909,969. The body 10 is provided within two longitudinal extending supporting channels 13 which are adapted to seat upon two longitudinal channels 14 which are the principal elements of the main frame 15. The longitudinal channels 14 are rigidly secured together by suitable transverse members and the main frame 15 constituted thereby is supported upon track laying wheels 16 which may be of any suitable type. The main frame 15 is provided with suitable hitch means (not shown) whereby the wagon or trailer may be operatively connected to a trailer or other traction means. At each end the channels 14 have mounted thereon a pair of spaced transverse channels 17.

Mounted between, and secured to these channels are hinge elements 18, one of said elements being located each corner of the body. Upon the body are mounted corresponding cooperating hinge elements 19, likewise located one adjacent each corner to cooperate with the hinge elements 18.

Each hinge element 18 of the frame is provided with an inner socket or cup 20, preferably of substantial size, and an outer socket or cup 21 which is preferably small compared with the socket 20. The hinge element 18, which may suitably be a casting, comprises side walls 22 which are provided at their upper ends with outwardly directed flanges 23 which rest on the top webs of the channels 17 and are secured thereto by rivets. The socket or cup 20 is preferably of semi-cylindrical shape, the ends of the cylinder being formed by the side walls 22. At its lowest point the cylindrical wall of the socket 20 is provided with an opening 24 for the escape of rain water, dirt and the like. The socket 21 is likewise of partial cylindrical shape. The socket 20 and the socket 21 are preferably constituted by a continuous web which provides these cylindrical surfaces and also a connecting web 25 and an outer web 26 which extend downwardly and inwardly, as best seen in Figs. 3 and 4. On each side of the socket 20, the hinge element 18 carries upwardly directed projections 27 which are located in substantial alignment with the transverse center of the socket 20. The projections 27 are provided with transversely aligned openings 28 which freely receive and guide a locking bar 29, which will hereinafter be more fully described.

Hinge element 19 is preferably in the form of a hollow casting provided with a main plate 30 whereby the same may be riveted to the body. Depending from the main plate 30 are the two parallel side walls 31 of the casting 19. These side walls are connected by webs 32 to provide a substantially box-like structure.

The webs 32 are provided with openings 33 and 34 so that the locking bar 29 may pass therethrough and permit a considerable degree of free movement between the hinge element 19 and the hinge element 18. The lower ends of the side plates 31 are normally received within the socket 20 and are correspondingly shaped so as to rotate freely therein. That is, the lower ends of the side walls 31 are substantially semi-circular and the interconnecting web 32 is of cylindrical form at that location so as to provide an ample bearing surface cooperating with the bearing surface of the socket 20.

Adjacent its upper end and on the outer face thereof the hinge element 19 is provided with a substantially cylindrical bearing member 35 which is adapted to be received in the corresponding socket 21 during the final portion of the tilting. The bearing member 35 may suitably be somewhat smaller in diameter than the socket 21. The bearing member 35 is preferably an integral portion of the casting 19 and is preferably formed with a core hole 36 to insure a more perfect casting at this point.

As best seen in Fig. 3, the hinge element 19 is provided with a transverse formation 37 which is located in the socket 20 and is normally positioned out of contact with the locking bar 29 so that this bar may be readily moved by hand for the purpose hereinafter described. The element 37 may suitably be a cylinder integral with the hinge element 19 and located within the confines of the side walls 31 between which it extends. The cylindrical element 37 preferably merges into the flange 32 and is suitably located at the lower end of the opening 33 in the outer face of the web 32. As best seen in Fig. 3, the cylindrical element 37 is located toward the outside away from the center of the socket 20 in its normal position.

The locking bars 29, as best shown in Fig. 1, extend transversely across the frame, one locking bar cooperating with the hinge elements in front and the other with the hinge elements at the rear. Each locking bar 29 is of such length that when it extends between the guide elements or projections 27 of the hinge element 18 on one side, its remote end is withdrawn into the innermost guide 27 on the other side of the wagon, as best seen in Fig. 1. The locking bars 29 at the front and the rear are adapted to be actuated in unison. When the bars 29 are thrown to the right, as viewed in Fig. 1, and the hoist 38, which may be of suitable type, is extended, the body will tilt to the right in the manner illustrated in dash-and-dot lines in Fig. 1. When the hoist 38 is retracted, the body will return to the full-line position.

The means for actuating the bars 29 together may suitably comprise a longitudinal rod 39 which extends from one end of the frame to the other and has bearings in the channels 17. Between these channels, at both ends of the frame, the rod 39 has rigidly mounted thereon an arm 40 having a bifurcated end which engages a projection 41 on the associated locking bar 29. Suitable stops 42 are provided so as to limit the extreme movement of the arms 40 so as to correspond with the locking position of the bars 29 on one side or the other, as best seen in Figs. 3 and 4. At one end of the wagon the rod 39 has rigidly mounted thereon a hand lever 43 whereby the desired actuation of the locking bars 29 may readily be effected.

It is very desirable to provide means to prevent accidental throwing of the hand lever 43 during the elevating movement of the body, and particularly during the initial movement of the body. For this purpose I provide a locking element 44 which is provided with an opening 45 which freely receives one of the locking bars 29, the opening 45 being somewhat deeper than the locking bar. The locking element 44 is provided within the opening 45 and, in the lower side thereof, with a tooth 46. The locking element 44 is normally pressed upwardly by means of a spring 47 which surrounds the main body portion of the locking element 46. The spring 47 is housed within a cylinder 48 which is mounted rigidly upon the channels 17 on each side of the locking bar 29. The associated locking bar is provided on its under side with a pair of notches 49 so located that when the locking bar is in either of its extreme positions, one or other of the notches 49 is immediately above the tooth 46. The locking element 44 is adapted to be pressed downwardly somewhat by contact with the body 10, when the body is in its normal load-carrying position. As a result of this contact between the body 10 and the locking member 44, the tooth 46 is normally maintained out of either of the notches 49 and out of engagement with the locking bar 29 so that the bars 29 may be thrown to one side or the other by means of the hand lever 43. When, however, the body rises for tilting to the appropriate side as a result of the extension of the hoist 38, the locking member 44 is moved upwardly and the tooth 46 is brought into the appropriate notch 39. Thereafter the handle 43 cannot be moved until the body returns to initial position and again depresses the locking member 44.

The operation of the wagon is as follows: To cause the wagon to dump to one side or the other, for example the right side, as viewed in Figs. 1, 3 and 4, the lever 43 is thrown to the right as viewed in these figures, and the locking bars 29 are consequently thrown to the right so that they extend between the guides 27 of the right-hand hinge members 18 and are withdrawn from between the guide members 27 on the left-hand side of the wagon. The hoist 38 is then caused to extend. In the event that the load is heavier on the left-hand side, the first thing that will happen is that the right-hand side of the body will move upwardly slightly until the contact members 37 on the right-hand side of the wagon abut against the locking bars 29. When this occurs the upward movement of the right-hand side of the wagon is terminated and the left-hand side of the wagon rises. As a result of this rising the cylindrical formations of the hinge elements 19 on the right-hand side of the wagon come into operative contact with their sockets 20. Of course, if the load is located more to the right-hand side, the initial rising of the right-hand portion of the wagon will not take place, and the left-hand side of the wagon will start to rise immediately the extension at the hoist 38 begins. As the hoisting continues, the cylindrical formation at the lower ends of the right-hand hinge elements 19 rotate within their sockets 20, the transverse contact elements 37 moving therewith in a planetary manner about the horizontal axis of the socket 20 as center. It will readily be understood that the bearing member 35 is carried by this movement towards the socket 21 and eventually it makes contact with this socket. At that time the transverse contact member 37 has arrived at a low position in the socket 20, in fact a position practically at the bottom of the socket 20.

The pivotal support of the tilting body is now taken over by the bearing members 35 and the sockets 21 on the right-hand side of the wagon. Continued extension of the hoist 38 consequently rotates the body about the bearing members 35. As a result of the movement of the hinge elements 19 about the bearing members 35 as centers, the contact members 37 elevate within the sockets 20 in the manner shown in Fig. 4. The slots 33 and 34 previously referred to are, of course, sufficiently long to permit this movement without fouling the locking bars 29. The extreme tilting movement of the body is preferably determined by the degree of extension of which the hoist 38 is capable. When the body is tilted to its extreme position the contact member 37 is preferably just out of contact with the associated locking bar 29.

It is to be noted that by transferring the pivotal support of the body from the sockets 20 to the sockets 21 during the latter portion of tilting, I am able to tilt much further than would otherwise be the case with a wagon in which gravity is relied upon to return the body to initial load-receiving position. Thus, as illustrated in Fig. 1, I may tilt the body upwardly to a position where its center of gravity may lie outwardly of the axis of the sockets 20. Since the center of gravity will, however, lie on the inner side of the axis of the sockets 21, it will readily be seen that when the pressure on the hoist 38 is released, the body will automatically return to load-receiving position.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. In a dump wagon, in combination, a wagon body, a frame on which said body is carried, socket members and pivot members carried by the body and frame providing axes for dumping on either side, means providing further axes outwardly beyond the first said axes, a locking bar extending transversely of the body adapted to lock a socket on one side or the other, and an eccentric member on the associated pivot located adjacent said bar during normal support and moving remote from the bar during dumping about the innermost axis to permit separation of the cooperating socket and pivot members during further tilting movement on the outermost axis.

2. In a dump wagon, in combination, a wagon body, a frame on which said body is carried, socket members on each side of the frame and corresponding pivots on each side of the body providing longitudinal axes for the dumping of the body to either side, means on said body and frame providing further axes outwardly of the first said axes, locking bars extending transversely of the body and adapted to close the sockets on one side or the other, and contact members carried by said pivots within the sockets and eccentric relative to said sockets, having a position near the locking bar in normal position of the body and moving remote from the bar during dumping about the innermost axis to permit separation of the cooperating socket members and pivots during further tilting movement on the outermost axis.

3. A hinge for dump wagons comprising a chassis element and a body element, said elements having a hollow pivot and socket defining an innermost dumping axis, means on said elements defining an outer dumping axis, a locking member across said socket and through said pivot, and an eccentric member on said pivot adapted to make contact with said locking member to control dumping and to move away from said locking member during the dumping about the innermost axis.

4. A hinge for dump wagons comprising a chassis element and a body element, said elements having a pivot and socket defining an innermost dumping axis, means on said elements defining an outer dumping axis, and a locking bar extending across said socket, said pivot comprising a member smaller than said socket and located therein adapted to engage said locking bar, said member having a position near the bar in normal load-carrying position of the hinge and being adapted to move away from the bar during dumping about the innermost axis.

5. A hinge for dump wagons comprising a body element and a frame element, means on said elements providing spaced pivotal axes for dumping, a movable locking member on one element adjacent the innermost axis having locking and unlocked positions, and means on the other element eccentric to said axis adapted to engage said locking member in its locking position, said means being normally located adjacent said locking member in its locking position, and moving relatively away therefrom during dumping about the innermost axis to provide freedom for movement during dumping about the other axis.

6. A hinge for dump wagons having an inner axis and an outer axis on which the body pivots during dumping, comprising a body element and a chassis element, movable locking means associated with one element in transverse relation to said inner axis and having locking and unlocked positions, and a contact member on the other element in planetary relation to said inner axis, said contact member being located near said locking means in load-carrying position when said means is in locking position whereby separation of the hinge elements is prevented, said contact member being adapted to move away from said locking means during tilting about the inner axis whereby to provide clearance between said contact member and said locking means for tilting about the outer axis thereafter.

7. A hinge for dump wagons comprising a body element and a frame element, means on said elements providing spaced pivotal axes for dumping, a movable locking member on one element adjacent the innermost axis having locking and unlocking positions, and means carried by the other element between said axes adapted to engage said locking element in its locking position, said means being normally located adjacent said locking member in its locking position and moving relatively away therefrom during dumping about the innermost axis to provide freedom for movement during dumping about the innermost axis.

8. A hinge for dump wagons comprising a chassis element and a body element, said elements having a pivot and socket defining an innermost dumping axis, means on said elements defining an outer dumping axis, and a locking bar slidably mounted in one element and extending across said socket, a member carried by the other element between the innermost and outer axis adapted to engage said locking bar, said member having a position near the bar in normal load-carrying position of the hinge and being adapted to move away from the bar during dumping about the innermost axis.

9. In a dump wagon, in combination, a wagon body, a frame on which said body is carried, socket members and pivot members carried by the body and frame providing axes for dumping on either side, means providing further axes outwardly beyond the first said axes, a slidable locking bar extending transversely of the body, and a member carried by the body between said innermost and outer axes located adjacent said bar during normal support and moving remote from the bar during dumping about the adjacent innermost axes to permit separation of the co-operating socket and pivot members during further tilting movement on the adjacent outer axis.

10. In a dump wagon, in combination, a wagon body, a frame on which said body is carried, socket members on each side of the frame and corresponding pivots on each side of the body providing longitudinal axes for the dumping of the body to either side, means on said body and frame providing further axes outwardly of the first said axes, and slidable locking bars extending transversely of the body and contact members each carried by the body between an innermost axis and an adjacent outermost axis having a position near one of the locking bars in normal position of the body and moving from the bar during dumping movement about its innermost axis to permit separation of the cooperating socket member and pivot during further tilting on its outermost axis.

JOSEPH KUCHAR.